May 7, 1963  H. LOWENTHAL  3,088,371
SYMMETRICAL SIX COMPONENT PHOTOGRAPHIC OBJECTIVE
Filed Aug. 5, 1960
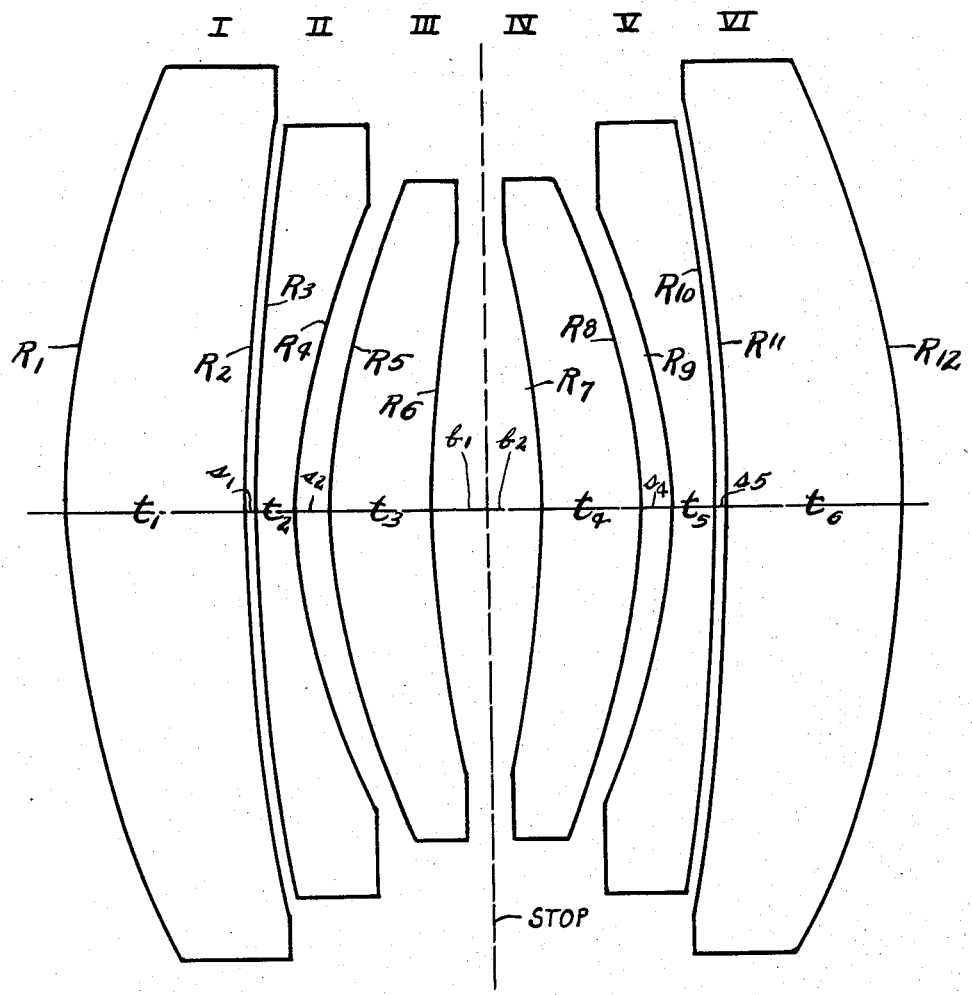
Inventor:
Herman Lowenthal.
By Zabel, Baker, York, Jones & Dithmar
Attorneys.

United States Patent Office 3,088,371
Patented May 7, 1963

---

3,088,371
SYMMETRICAL SIX COMPONENT PHOTOGRAPHIC OBJECTIVE
Herman Lowenthal, Chicago, Ill., assignor to General Scientific Corporation, Chicago, Ill., a corporation of Illinois
Filed Aug. 5, 1960, Ser. No. 47,657
2 Claims. (Cl. 88—57)

This invention relates to a symmetrical photographic objective for operation at substantially unity magnification or with reasonable departure therefrom. For work of this character a greater than normal angle of field is important and the present invention contemplates an objective having a moderate rather than a wide angle of field.

It is well known that a normal photographic objective has its focal length substantially equal to the diagonal of the film upon which the image to be photographed is focused. Such a lens usually has a covering power of about 53 degrees. If the lens is designed to cover a larger field, it is generally regarded as belonging to the wide angle variety. Such wide angle lenses may have fields of as much as 140 degrees although the present invention has a somewhat smaller field.

As is well known, the extent of the field angle is also governed by the lens application. Thus where a lens works at infinity and has its conjugate distances respectively at infinity and focal length, then its covering power or field is at a maximum. As an example, a lens, having a field of 80 degrees under such operating conditions, may have its field reduced to 60 degrees when operating on objects at less than infinite distance, particularly when the conjugate distances are equal as in unity magnification.

A photographic objective embodying the present invention may be designated as a semi-wide angle type where the field is about 56 degrees for unity magnification, it being understood that the field coverage is of excellent quality. One of the difficulties in lenses having a larger than normal field coverage is the illumination at the edge of the field. As a rule, the intensity of illumination falls off so rapidly with distance from the principal axis of the lens due principally to the cosine fourth power law that serious exposure difficulties are encountered. Another difficulty is the vignetting effect, this having a tendency to reduce the effective area of the lens aperture.

In order to minimize vignetting and fringe illumination effects, it is desirable to reduce the vertex distance of the entire objective to as low a value as possible. On the other hand, it is also desirable to use air spaces between components and avoid cementing. This eliminates the necessity for optical alignment and also permits proper adjustment of the separation between opposed vertices for maximum performance. Some provision for adjustment is highly desirable since the lens components in production are difficult to manufacture within the thickness of tolerances required for eliminating adjustments.

By virtue of the present invention the above apparently conflicting characteristics are reconciled very satisfactorily while at the same time the lens components have sufficient thickness at the edges so that they may be handled in production.

Photographic objectives symmetrical with respect to a center stop have been known for a long time. Thus in 1900 an anastigmatic wide angle lens having a covering angle of 135 degrees was known. This was a simple two lens system, each lens element consisting of a thin converging meniscus whose curvature was quite deep. This could only be operated satisfactorily at low aperture, such as F:32.

The simple objective referred to above was refined by doubling the number of lens components. This resulted in two outer menisci lenses of positive power enclosing two menisci of negative power (the power equals the reciprocal of focal length). The center stop was between the inner negative power lenses. The sharper the curvature of the lens surfaces, the greater the field covered up to 90 degrees for infinity. Such a lens system is not too satisfactory because of poor resolution and vignetting.

Next, a symmetrical lens system having three elements as a group on each side of a stop has been used. As a rule, each group on a side of the stop may consist of two positive elements and one negative or the reverse. The first arrangement usually provides for cementing at least two adjacent lenses but up to now has labored under the disadvantage of long vertex distance. This results in poor illumination at the edge. The second arrangement with two negative elements enclosing a positive element has the advantage of short vertex distance but has all lenses in each group cemented together.

In accordance with the present invention, a photographic objective having two groups of three components each is provided. The new objective is symmetrical with respect to the stop and therefore provides the inherent corrections of a symmetrical system. Such corrections are for coma, distortion and chromatic differences of magnification. In addition to the above inherent corrections due to symmetry, the present invention provides a lens system having minimum spherical aberration, curvature of field and astigmatism and is highly corrected for the entire field of 56 degrees. As a rule, symmetrical lens systems having short conjugate distances and covering more than 50 degrees of field have speeds less than F:9. This invention provides such a lens system where the speed is substantially greater and in the example here, the speed is F:6.8.

The lens system embodying the present invention has two groups, each group having two positive lens components on opposite sides of a negative lens component. The new objective has the focal lengths of the two positive components in a group almost equal while the negative component has a shorter focal length. Thus the positive powers are almost symmetrical with respect to the negative power. The ratios of focal lengths in a group are of the order of 5:3:5. The index of refraction of the positive elements is 1.651 while that of the negative element is 1.605.

The indices given above are exemplary and may be varied, provided their difference is between 0.040 and 0.050. The new objective has a short center air space of 2.6% of the focal length of the objective. This makes for a short overall vertex length compared to lens diameter and helps achieve the wide covering power with minimum decrease of illumination toward the edge of the field. The new objective avoids the use of cemented junctions and instead utilizes air spaces between the lens components.

The new objective has high speed together with excellent resolution and for about unity magnification has excellent correction and a moderately wide field angle.

An example illustrating the present invention is shown in the drawing where the single FIGURE shows a representation in conventional manner of an objective embodying the present invention. The usual conventions in showing lenses are observed with the lens components carrying Roman numerals, lens I being at the entrance and lens VI being at the exit end for light. The radius of curvature is designated by R with a subscript to identify the particular lens surface. The lens thickness is designated by $t$ with suitable subscript and air spaces are designated by $s$ with subscripts. It is understood that some small variations in dimensions are permissible, so adjustments in air spaces may be necessary for maximum operation.

The constructional data for an objective embodying the present invention is as follows:

[Speed=F:6.8. Effective focal length (EFL)=100. Back focal distance (BFD)=91.50]

| Lens | | $N_d$ | V |
|---|---|---|---|
| I, VI | $R_1=-R_{12}=+22.965$<br>$t_1=\ \ t_6=\ \ 4.482$<br>$R_2=-R_{11}=+54.680$<br>$s_1=\ \ s_5=\ \ 0.100$ | 1.651 | 55.8 |
| II, V | $R_3=-R_{10}=+54.680$<br>$t_2=\ \ t_5=\ \ 1.000$<br>$R_4=-R_9\ =+14.782$<br>$s_2=\ \ s_4=\ \ 0.815$ | 1.605 | 43.8 |
| III, IV | $R_5=-R_8\ =+16.508$<br>$t_3=\ \ t_4=\ \ 2.432$<br>$R_6=-R_7\ =+27.560$<br>$b_1$ to Stop=Stop to $b_2$=1.300 | 1.651 | 55.8 |

The focal lengths of each of lenses I and VI are 0.576 while the focal length of each of lenses III and IV are 0.582. Lenses II and V each have a focal length of 0.338. Thus the positive power lenses (I, VI, III and IV) are almost equal and are on opposite sides of the negative power lenses (II and V). The ratios of focal lengths are of the order of 5:3:5. The index of refraction $N_d$ has a difference of 0.046 in the example. This difference however, may go as low as about 0.040 and as high as about 0.050. The Abbe number (V) is as given. Some small variation of V with change in index of refraction over the given range is permissible. The air space $b_1$ plus $b_2$ between opposing inner lenses III and VI is about 2.6% of the focal length. This with the remaining short air spaces and lens thicknesses provide a short overall vertex length for the objective. Thus the objective has a full field of 56 degrees (28° on each side of the principal axis). At the same time there is minimum decrease of illumination at the margin of the field.

From the above description it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. A symmetrical six component photographic objective having a stop between the inner two lenses, said objective having a lens group on each side of the stop, the two outer lenses in each group having positive powers with the enclosed lens in each group having a negative power, the two positive powers being about equal with the respective focal lengths of the lenses in a group having a ratio of the order of 5:3:5, the enclosed lens in each group having an index of refraction less than that of the outer lenses in each group, all the outer lenses in the two groups being of the same glass and the enclosed lenses also being of the same glass and the index difference being between 0.040 and 0.050, said components being separated by air spaces, the center air space being about 2.6% of the focal length of the objective and the air spaces in each group at the outer and inner vertices of said enclosed lens being about 0.100% and 0.815%, respectively, of the focal length of the objective, said objective having a field angle of about 56 degrees for substantially unity magnification and being fully corrected and having good fringe illumination and a speed in excess of F:9.

2. The objective according to claim 1 wherein the objective and lenses have the following characteristics:

[Speed=F:6.8. Effective focal length (EFL)=100. Back focal distance (BFD)=91.50]

| Lens | | $N_d$ | V |
|---|---|---|---|
| I, VI | $R_1=-R_{12}=+22.965$<br>$t_1=\ \ t_6=\ \ 4.482$<br>$R_2=-R_{11}=+54.680$<br>$s_1=\ \ s_5=\ \ 0.100$ | 1.651 | 55.8 |
| II, V | $R_3=-R_{10}=+54.680$<br>$t_2=\ \ t_5=\ \ 1.000$<br>$R_4=-R_9\ =+14.782$<br>$s_2=\ \ s_4=\ \ 0.815$ | 1.605 | 43.8 |
| III, IV | $R_5=-R_8\ =+16.508$<br>$t_3=\ \ t_4=\ \ 2.432$<br>$R_6=-R_7\ =+27.560$<br>$b_1$ to Stop=Stop to $b_2$=1.300 | 1.651 | 55.8 | wherein "R" stands for the radius of curvature; "$t$" is the thickness of the lens; "$s$" is the space between adjacent lenses; "$b$" is the distance between the adjacent lens surface and a stop; "$N_d$" is the index of refraction and "V" is the Abbe number.

References Cited in the file of this patent

UNITED STATES PATENTS 2,601,592    Cook ------------------ June 24, 1952

FOREIGN PATENTS 3,398     Great Britain ------------------ 1905
16,331    Great Britain ---------- July 12, 1912